(12) United States Patent
Sienel et al.

(10) Patent No.: US 10,536,501 B2
(45) Date of Patent: Jan. 14, 2020

(54) AUTOMATED COMPRESSION OF DATA

(71) Applicant: Alcatel Lucent, Boulogne Billancourt (FR)

(72) Inventors: Juergen Sienel, Stuttgart (DE); Markus Bauer, Stuttgart (DE)

(73) Assignee: Alcatel Lucent, Nozay (FR)

( * ) Notice: Subject to any disclaimer, the term of this patent is extended or adjusted under 35 U.S.C. 154(b) by 381 days.

(21) Appl. No.: 14/392,286

(22) PCT Filed: Jun. 5, 2014

(86) PCT No.: PCT/EP2014/061679
§ 371 (c)(1),
(2) Date: Dec. 23, 2015

(87) PCT Pub. No.: WO2014/206703
PCT Pub. Date: Dec. 31, 2014

(65) Prior Publication Data
US 2016/0182591 A1    Jun. 23, 2016

(30) Foreign Application Priority Data

Jun. 24, 2013 (EP) .................................. 13305864

(51) Int. Cl.
*G06F 15/16* (2006.01)
*H04L 29/06* (2006.01)
*H04L 29/08* (2006.01)

(52) U.S. Cl.
CPC .......... *H04L 65/605* (2013.01); *H04L 65/403* (2013.01); *H04L 65/607* (2013.01); *H04L 67/10* (2013.01)

(58) Field of Classification Search
USPC ........................................................ 709/204
See application file for complete search history.

(56) References Cited

U.S. PATENT DOCUMENTS

| 7,814,211 B2 * | 10/2010 | Vernal | G06F 9/465 |
| | | | 370/352 |
| 8,000,708 B1 * | 8/2011 | Woleben | H04W 36/026 |
| | | | 370/329 |

(Continued)

FOREIGN PATENT DOCUMENTS

| EP | 2 400 389 A1 | 12/2011 |
| JP | H07175707 | 7/1995 |

(Continued)

OTHER PUBLICATIONS

Bauer et al. (European Patent Application No. 10305678.4, Date of filed: Jun. 24, 2010, Date of Publication: Dec. 28, 2011, EP2400389A1.*

(Continued)

*Primary Examiner* — Razu A Miah
(74) *Attorney, Agent, or Firm* — Fay Sharpe LLP

(57) ABSTRACT

The application relates to a system comprising at least two processing nodes (1), wherein the nodes (1) comprise an execution environment (2) and a processing component (3), wherein each execution environment (2) includes an establisher configured to establish a communication channel (4) between an outgoing port of the processing component (3) and an inbound port of a different processing component (3), and wherein the system is configured to determine whether the communication channel (4) traverses a boundary of a node (1), and to determine whether an encoding/decoding of data to be transferred through the communication channel (4) is required.

16 Claims, 4 Drawing Sheets

(56) References Cited

U.S. PATENT DOCUMENTS

| | | | |
|---|---|---|---|
| 8,615,263 B2* | 12/2013 | Madon | H04W 16/04 455/431 |
| 8,838,830 B2* | 9/2014 | Igelka | G06F 9/5083 370/255 |
| 2001/0025310 A1* | 9/2001 | Krishnamurthy | G06Q 10/06395 709/223 |
| 2003/0131122 A1* | 7/2003 | Kondo | H04L 1/1671 709/233 |
| 2005/0243793 A1* | 11/2005 | Kim | H04W 24/00 370/347 |
| 2006/0221992 A1* | 10/2006 | Chan | H04L 1/0001 370/445 |
| 2006/0245448 A1* | 11/2006 | Chan | H04W 74/0825 370/455 |
| 2007/0127490 A1* | 6/2007 | Barbosa Da Torre | H04W 16/18 370/395.2 |
| 2007/0180149 A1* | 8/2007 | Vernal | G06F 9/465 709/246 |
| 2007/0190997 A1* | 8/2007 | Moon | H04B 7/022 455/422.1 |
| 2008/0165896 A1* | 7/2008 | McKillop | H04N 21/4126 375/316 |
| 2009/0092154 A1* | 4/2009 | Malik | H04L 12/2856 370/480 |
| 2009/0276771 A1* | 11/2009 | Nickolov | G06F 9/4856 717/177 |
| 2010/0042716 A1* | 2/2010 | Farajidana | H04W 16/10 709/224 |
| 2010/0077013 A1* | 3/2010 | Clements | G06F 16/1748 707/822 |
| 2010/0185719 A1* | 7/2010 | Howard | G06F 8/45 709/201 |
| 2010/0195663 A1* | 8/2010 | Sharma | H04L 49/3072 370/419 |
| 2010/0262829 A1* | 10/2010 | Brown | H04L 63/061 713/171 |
| 2010/0268836 A1* | 10/2010 | Jabri | H04L 47/38 709/231 |
| 2011/0161076 A1* | 6/2011 | Davis | G06F 3/04842 704/231 |
| 2011/0276710 A1* | 11/2011 | Mighani | H04N 21/4325 709/231 |
| 2011/0282949 A1* | 11/2011 | Rivkin | G06F 9/541 709/206 |
| 2012/0089664 A1* | 4/2012 | Igelka | G06F 9/5083 709/203 |
| 2012/0219005 A1* | 8/2012 | Durve | H04L 47/41 370/400 |
| 2012/0243648 A1* | 9/2012 | Currivan | H04L 25/03159 375/346 |
| 2012/0281708 A1* | 11/2012 | Chauhan | H04L 63/0272 370/401 |
| 2012/0282962 A1* | 11/2012 | Madon | H04W 16/04 455/509 |
| 2013/0128832 A1* | 5/2013 | Kang | H04W 72/042 370/329 |
| 2013/0290957 A1* | 10/2013 | Li | G06F 9/5066 718/1 |
| 2013/0294355 A1* | 11/2013 | Billonneau | H04L 65/605 370/329 |
| 2014/0056250 A1* | 2/2014 | Cattoni | H04W 72/02 370/329 |
| 2014/0067758 A1* | 3/2014 | Boldyrev | H04L 67/1097 707/610 |
| 2014/0108665 A1* | 4/2014 | Arora | H04L 67/141 709/227 |
| 2014/0192803 A1* | 7/2014 | Malik | H04L 45/00 370/389 |
| 2015/0140975 A1* | 5/2015 | Wright | H04W 4/90 455/414.1 |

FOREIGN PATENT DOCUMENTS

| | | |
|---|---|---|
| JP | 2007188523 A | 7/2007 |
| JP | 2008502229 | 1/2008 |
| JP | 200949905 | 3/2009 |
| JP | 2011-242962 | 12/2011 |
| WO | 2010039915 | 4/2010 |

OTHER PUBLICATIONS

International Search Report for PCT/EP2014/061679 dated Jul. 18, 2014.

* cited by examiner

AUTOMATED COMPRESSION OF DATA

The present document relates to a control unit and a system which automatically decide, whether data is transferred in an encoded manner, particularly in the context of distributed processing of an application.

Nowadays data, computer programs, and applications are increasingly stored and executed in network centric data centers ("the cloud"). However, due to bandwidth and end-to-end delay limitations, particularly in the technical field of distributed real-time processing of media data in the cloud, the processing of real-time media particularly requires sensibility with respect to transport data across network links.

In a Platform-as-a-Service (PaaS) approach, functionality is provided that automatically distributes an application consisting of separable software components onto processing nodes located in different parts of the network. This distribution is applied in order to minimize traffic in the transport networks exploiting locality of shared data, optimize the resource utilization of processing nodes, and improve the user experience by processing delay sensitive tasks close to a user's location in the network. In a cloud based processing environment, different data transport scenarios between separate software tasks executed on distinct processing nodes may apply. Typical scenarios are media data transport to and from end-devices to a media processing node across a network, media data transport between processing nodes within a single data-center, and media data transport between processing nodes located in different data-centers.

A typical application scenario which profits from distributed processing on a service platform is for example video chat. In the video chat scenario, e.g. a group of people join a virtual shared video environment/video chat room. Each person streams video data of its camera(s) into the cloud. The video chat service combines all media streams of users meeting in such a shared environment and generates (i.e. processes) a personalized view of the virtual room for each participant. Thus, each person in the virtual room receives back a personalized rendered view of all (other) participants.

It is assumed that an application, e.g. video chat, may be divided into distinct processing parts (i.e. processing components) executed across different processing nodes in the cloud. A typical scenario comprises:
Preprocessing of the camera signals like e.g. back-ground subtraction, face or activity detection, e.g. a "who is speaking"-function, being, preferably, arranged on processing resources located close to the data generating source.
A module controlled by a user's interaction to determine the specific part of the video that should be extracted from a real camera's signal, which has a high resolution, by selecting the pan/tilt and zoom factors of a virtual camera.
Video mixing functionality merging all the different video signals of people in the chat room on processing resources in the cloud, preferably located in the "center of delay" for all participants.
Personal viewpoint rendering, controlled by, e.g., interactive gestures or other means of an end-user, preferably located on processing resources located close to this user.

For example, a processing part in the video chat application may be background extraction. This part might be built up and composed of a number of processing components performing distinct tasks like color conversion, comparing of an actual frame with a background model, statistical update of the background model, foreground mask generation, etc.

For example in a platform scenario, components may communicate via a message passing interface connecting output port(s) of a sending component with input port(s) of one or more receiving components. A developer may create and maintain a running instance of his application by orchestrating a dynamic service logic graph composed from the different processing elements which make up the application.

Manipulations of the graph include creation, modification or removal of components, and establishment or release of connections between components in a dynamic fashion. From the developer's perspective, the platform behaves like a single virtual processing resource and it is the task of the platform to deploy the different components of the application in a suitable way onto the physical infrastructure resources as described before.

Typically, the processing capacity which is needed for each specific task depends on different media parameters. The parameters may be image resolution, frame rate, number of participants, etc. Further the number of resources that is needed to execute the desired functionality may depend on resource capabilities and the current load situation of individual processing nodes (which can fluctuate quickly).

Therefore, it is generally difficult for an application developer to predict, how the different components of the application are most efficiently distributed across the different processing nodes. As only the platform has the required information, it is the task of the platform to decide how to resolve resource bottlenecks, appearing at service runtime, on a resource by a redistribution of some processing parts/components, which are currently executed on this resource, onto another currently less utilized resource.

However, a fundamental problem for distributing the components of a video application, like e.g. a video chat service, is the huge amount of data exchanged between components because many media processing components primarily operate on a series of pixel values (i.e. a single video frame). Thus, a component sends typically a complete frame of pixel values, i.e. an uncompressed video frame (raw data), to its output port(s). This makes it difficult to split the application components across different processing nodes as the raw 'video' traffic needs to be transported over the network connecting the different processing nodes, i.e. exchanged, and thus may lead to network congestion. Therefore, media data being exchanged between components executed on different processing resources needs to be compressed in a meaningful way.

As the developer of a service graph at the development time is not aware of how the platform will split the different service components across processing resources at service runtime, there is a need for platform functionality which automatically includes compression (i.e. encoding/decoding) into communication paths whenever needed.

The present document addresses the technical problem of providing a control unit, a system and a method being, in particular, usable in a system which has at least two of said processing nodes, such as processing nodes being connected to each other in network centric data centers. The control unit, the system and the method enable to automatically determine whether an encoding and decoding of data is required and to dynamically instantiate a data dependent compression mechanism between sending and receiving components.

Analyzing the data format of a message, which comprises a header and the data to be transferred (payload) and which passes an external network interface, the here-described aspects allow inserting a data format dependent encoder on the sender's side, sending a control message to the receiver's side indicating the compression format (i.e. data format), and dynamically compressing each following message using the compressor's instance. Further, the data being transferred with the message may be decoded on the remote side and may be delivered to the receiving component after the decoding.

Note that all this may be executed transparent to the developer of such a service, because from the service logic flow, no care must be taken if the components are executed on the same or distinct resources. Media compression is included into the components communication path autonomously and only if needed by the underlying platform.

Further note that the reverse part is also covered. If two components previously running on different resources are, for some reason at service runtime, placed on the same resource, the formerly external communication path becomes internal and thus media encoding and decoding functionalities will automatically be removed from the communication path by the platform.

Thus, the here-presented control unit and system have the technical advantage that the components being connected via the communication channel do not notice the difference whether data has been received from a local or a remote component, while at the same time the data rate on the network link has been reduced. Thus, the whole compression scheme is hidden from the developer, who cares only about the components, which do not see that compression within their connection has happened.

Specifically, the present document provides a control unit, an autonomous system and a method, in particular, for network centric data centers, i.e. a cloud environment, which are able to dynamically instantiate a data dependent compression mechanism between sending and receiving components, particularly by detecting that a communication channel between the components for any reason uses an external transport network instead of a node internal communication channel.

According to an aspect, a control unit may be configured to determine whether a communication channel between two processing nodes traverses a boundary of a processing node. When the communication channel traverses a boundary of one of the processing nodes, the control unit may further be configured to determine whether an encoding/decoding of data to be transferred through the communication channel is required. The control unit may be part of a processing node, e.g. a sending processing node or a receiving processing node. Alternatively or in addition, the control unit may be provided by a separate entity of a system comprising different processing nodes located in different data-centers.

According to a further aspect, a system is provided which may comprise at least two processing nodes which are connected by a network. Each node may have an execution environment and at least one processing component. Each execution environment may include means for connecting an outgoing port of a component sending data with an inbound port of a component receiving data via a communication channel. The system, preferably the control unit of the system, may be configured to determine whether the communication channel traverses a boundary of a node, as described above. Further the system, preferably the control unit of the system, may be configured to determine, when the communication channel traverses a boundary of a node, whether encoding/decoding of data to be transferred through the communication channel is required.

The traversal of the boundary of a node may be detected when the communication channel uses an external transport network, such as a local area network (LAN) or a wide area network (WAN). For example, if the node is a unit comprising a processor, storage means and network interfaces, an external transport network may be defined to be a network which connects nodes with each other, and more specifically the network interfaces of the nodes. The traversal of a boundary of the node may be defined as the traversal of a network link. Preferably, the traversal of a boundary of a node may be detected in case that a network protocol, such as RTP, UDP, TCP, IP, is used for sending the data through the communication channel. For example, a network boundary is traversed when one processing component operates on one network node and another processing component that is in communication with the first component is operating on another network node.

It is noted that in the following the term "system" may be replaced by the word "platform". The term "data" may specify information which is exchanged/transferred between parts/nodes/components of the system. The term "message" means substantially a header of a message plus the data to be transmitted (payload).

The term "encoding/decoding" specifies encoding and/or decoding. Particularly, it specifies encoding and decoding meaning that at one side, from which the message/data is sent, the data is encoded (compression) and at the other side, the receiving side, the data is decoded.

In the following it will be assumed that a first component is a component which sends data, i.e. it is a "sending component", and that a second component is a component which receives data, i.e. it is a "receiving component".

However, it is noted that the system can comprise more than two nodes and more than two components. Further, a plurality of different communication channels can be established between two or more nodes. In particular, the sending component may be configured to be connected via one or more communication channels with at least one receiving component.

The terms "receiving node" and "sending node" specify a node which comprises the receiving/sending component. The term node may specify a computing resource or a host which preferably comprises at least one processor, at least one storage device, and at least one network adapter. In other words, a node is preferably a fully operational, stand-alone processing unit which is connected in a network with other nodes.

According to a further aspect, the sending component can be configured to be connected via one or more communication channels with at least one receiving component. By establishing one or a plurality of communication channels between (one or a plurality of) components, application components may be distributed in a flexible manner.

Further, the system may comprise a table containing information about each established communication channel. Said information may comprise, for each communication channel, the port of the sending component and of the receiving component of the communication channel. Further said information may comprise an identifier when the receiving component is located within a different node than the sending component. The identifier may identify a network location of the remote receiving node. Preferably, the table may be located and stored within a specific (dedicated) processing node, possibly a local copy is available in each processing node. Further, each processing node may have a partial copy of the table containing, e.g. only, information about processing components which run on said node.

The table allows to maintain an overview and to provide quick access to the most relevant information with regard to the connections between the plurality of components. The identifier supports that determination of crossing of a border of a node can be carried out more quickly and using less computing resources.

The system, in particular the control unit and/or an execution environment hosting the corresponding sending component, can be configured to detect whether the communication channel traverses a boundary of a node by a lookup operation in said table. The lookup operation may be adapted to detect whether an entry, which may indicate that a component has been moved, i.e. a reallocation of the processing component, or which may indicate a creation of a connection with a component on a remote host, is set. The entry may, e.g., be a first flag being set in said table. Alternatively or additionally, the lookup operation may be adapted to read said identifier for finding the location of the node of the receiving component. The lookup operation allows that the determination of whether a communication channel passes the boundary of a node can be carried out more or less instantly and without an excessive use of computing resources.

Further, for example, when a communication channel is established between two components and if a sending and/or a receiving component is/and moved afterwards from one node to another node, the system, in particular the execution environment, may further, be configured to add said entry to said information in said table. The entry may signalize a component move and, thereby, enable a quicker determination whether a communication channel, particularly an already existing communication channel, traverses the boundary of a node.

Further, the system may be able to determine that encoding/decoding is required in case that the data to be transferred exceeds a pre-determined size. Particularly, the size or volume of the data stream on the sending or on the receiving side (network interface capacity), and/or capacity restrictions of the physical network channel are of interest. Typically, video related data or high quality audio data trigger the encoding/decoding requirement.

The system may be able to determine that encoding/decoding is required in case that the data to be transferred has a pre-determined data format, i.e. based on the format of the data type. The pre-determined data format may comprise e.g. media formats. That means that the system can be configured to encoded/decode generally if media data, such as data having an image data format, an audio data format, and/or a video data format, is transferred from a node to a remote node.

Further, the encoding/decoding may be required in case that the data is video data which is sent in a frame-by-frame manner. If a component sends a complete frame of pixel values, i.e. an uncompressed video frame (raw data), to its output port(s), a great amount of data is exchanged between components via the communication channel. This may make it difficult to split application components across different processing nodes. However, with the here-described automatic compression of data, also the sending of video frames is possible so that the automatic distribution of components of a video data application is enabled.

The system may be able to determine that encoding/decoding is required in case that that one of the sending and the receiving nodes or both operate at a predetermined work load. This may include the case that when the nodes already operate at a high work load, the encoding/coding is not initialized if the additional work load associated with the encoding/decoding would result in an overload of at least one of the nodes.

According to an aspect, a sending processing node may comprise at least one execution environment, at least one processing component, and at least one outgoing port being connectable via a communication channel with a receiving processing node for sending data through the communication channel. The execution environment may be configured to establish the communication channel. The receiving processing node may comprise the control unit. Further, the sending processing node may be configured to instantiate an encoder and to inform the receiving processing node about a type of encoder being instantiated, if encoding is determined to be required. Further, a receiving processing node may comprise at least one processing component, and at least one inbound port being connectable via a communication channel with a sending node for receiving data through the communication channel. The sending processing node may comprise the control unit. The receiving processing node, further, may be configured to instantiate a decoder, if encoding is determined to be required, based on information about a type of encoder being instantiated at the sending processing node.

Further, a (processing) node may be provided, which may comprise an execution environment and at least one processing component. The execution environment may include means for connecting an outgoing port of a component sending data with an inbound port of a component receiving data, which may be located on a different node, via a communication channel. The node (e.g. a control unit of the node) may be configured to determine whether the communication channel traverses a boundary of the node. Further, the node may be configured to determine, when the communication channel traverses a boundary of a node, whether encoding/decoding of data to be transferred through the communication channel is required in order to reduce traffic over the external communication channel, e.g. a communication network connecting the nodes.

The node may be part of a network which comprises further processing nodes. The nodes may be connected with each other in the network. The advantage of the above-explained node is that the node may automatically determine whether data should to be transferred through a communication channel in an encoded manner. E.g., assuming that the node is a unit having at least one processor, at least one storage means, and a network interface, the node may determine that the communication channel traverses a boundary of said node if the communication channel connects to an outside of said unit via said interface. In other words, the node may determine that a boundary of said node is traversed, if the communication channel connects the network interface of said node with a different network, interface of a different node. The node may further determine that encoding is required, if the type of data being sent through the communication channel is of a particular type, e.g. a media data type, such as audio, image or video data.

It is noted that the functionality and aspects of the system being described above may be integrated into each node. For example, the determining whether the communication channel traverses a boundary of a node and whether encoding/decoding is required may be carried out by one of the sending or the receiving node, in particular its execution environment. The table may be handled by a functionality of a node, as well as the lookup operation may be carried out by functionality of e.g. the sending node. Alternatively, a network-wide control instance may be provided to implement these functions.

Further, the system may comprise an application distribution function, which may automatically distribute processing components of an application over nodes so that each (processing) component is processable individually/separately by a node. Typical applications are related to the processing of multimedia applications, such as video chat, audio chat, video streaming, etc.

Hence, the system advantageously allows instantiating and including a compression function dynamically in the data-stream of a communication channel which transports data, e.g. video data or any other media data, between service components, whenever a traversal of a network link (i.e. processing node external communication between two components) is detected.

For example, on a platform, e.g. a multimedia-content cloud, an application developer does not know when messages traverse a network link on an established communication channel between two components as component placement decisions are executed dynamically at runtime by the platform. In the proposed system, the execution environment instantiates a compression function (i.e. instantiates an encoder on the resource hosting the sending component and a decoder on the resource hosting the receiving component), whenever a processing node border (i.e. an external network interface or network link) is passed by a communication channel and/or the expected data size or data rate may introduce overload on the network link.

In such a case, according to embodiments, the execution environment determines a basic codec (coder and decoder) format and automatically instantiates an encoder on the sending side and a decoder on the receiving side as part of a message passing interface. For example, in a platform scenario, components may communicate via the message passing interface connecting the output port(s) of a sending component with input port(s) of one or more receiving components. The instantiating of the codec may happen e.g. when a new communication channel between a local component and a remote component is established or when an existing local connection becomes a remote connection as the platform resource management algorithm has decided to migrate one of the components to another processing resource/node.

The codec format can be determined either by the message type of the inbound port of the receiving or the output port of the sending component, a specific (application developer pre-determined) property of the logical link used for data exchange between the two components, or by the type of messages that pass along the connection.

Upon sending of a message across a connection, i.e. communication channel, platform functionality passes the data to the encoder for compression, sends it over the external network using a standard network protocol (e.g. RTP, UDP, TCP, IP), decodes, it at the remote site and finally passes it to the receiving component in the original uncompressed format. The transport of the data is carried out in order to facilitate a distributed processing of an application. The processing of components of the application is performed by processing nodes which are connected to each other in a network.

A further aspect relates to a method for data communication within a system. The system may have at least two nodes. The nodes may have an execution environment and a processing component. The execution environment may include means for connecting an outgoing/outbound port of a processing component, which may send data, with an inbound port of a processing component, which may receive data, via a communication channel. The method may comprise the step of determining whether the communication channel traverses a node boundary. This may be done, e.g., upon the establishing of the communication channel between a sending node and a receiving node. Further, the method may comprise determining whether an encoding/decoding of data to be transferred through the communication channel is required, particularly when it is determined that a boundary of a node is traversed. The method may comprise initializing an encoder within the node of a sending component and a decoder within the node of the receiving component, if encoding/decoding is determined to be required. The method may further include providing the data to be transferred from the sending component to the encoder, and encoding the data within the encoder. The encoded data may be sent through the communication channel to the receiving node.

This method has the advantage that data, which is sent through a communication channel, may be automatically encoded/decoded so that a data traffic, which is e.g. caused in a system which processes an application in a distributed manner, i.e. the application is processed by different processing nodes, may be flexibly reduced.

Further, after the encoder was instantiated within the node of the sending component, a control message (information), which may comprise information about a type of encoder being instantiated, may be sent from, e.g., the execution environment of the node of the sending component to, e.g., the execution environment of the node of the receiving component. The decoder may be instantiated based on information comprised in the control message. Preferably, the data to be transferred may be sent from the sending node to the receiving node through the communication channel upon instantiation of the decoder. Alternatively, the control information may be sent together with the data to be transferred, e.g. the data to be transferred may be sent within a message which also comprises control information regarding applied encoding/compression functions on the sending side. Sending the control information and the data to be transferred within one message allows to further reduce network traffic.

Accordingly, there are several alternative options for instantiating a codec, and for sending data through a communication channel which crosses a node boundary. A control message may be sent to the receiving node after an encoder was instantiated at the sending side. The control message submits information about, e.g., the encoder type to the receiving side so that a corresponding decoder may be instantiated. A further option may be that an encoder may be instantiated and data to be transferred may be encoded on the sending side. According to this option, subsequently, a message may be transferred to the receiving side which comprises the encoded data as well as control information about encoding/compression, e.g. in a header part of the message. Thus, both, the control information and the data to be transferred arrive at the receiving side at the same time. The decoder may be instantiated in accordance with the control information in the message before decoding the transferred encoded data. An even further option may be to use a pre-determined codec which may be fixedly instantiated for a communication channel e.g. upon establishing the communication channel. The pre-determined codec may be instantiated before sending messages/data through the communication channel. The option of instantiating a pre-determined codec may be preferable in case that, e.g., a fixedly set coding/decoding shall be used for every data being transferred through the communication channel.

A second flag may be attached to the data to be transferred in case the data is compressed data, for example by setting the second flag in a header of a data message. This may be done for indicating to the node of the receiving component that a decoding is required so that it may be possible to quickly detect on the receiving side that decoding is required. Furthermore, the second flag may also be used to indicate the encoding type format which was used by the encoder of the sending side to the receiving side.

The method may comprise that the encoder of a sending side and the decoder on a receiving side are instantiated at the time of establishing the communication channel and before sending data through the communication channel. Further, the type of encoding/decoding may be fixedly pre-set for the communication channel based on an expected data type, such as audio data or video data, and/or the size of the data to be transferred through the communication channel. Accordingly, a developer may set a preferred codec format for a specific communication channel based on his knowledge, e.g., about the data which shall be sent through said communication channel. E.g. the developer might designate a video codec expecting that only video data will be transferred. Thus, a fast setup time can be achieved.

Summarizing, it is an advantage of the here-presented aspects that application developers have not to deal with detailed component control giving much higher flexibility to the application design. The platform is responsible to find an optimal instantiation of the components on the available resources, not the developer of a service. This reduces the development effort for building distributed cloud centric media services as the developer no longer has to care about the placement of components onto resources, which can even change at service runtime.

It is noted that the above-outlined aspects may be performed in a data processing apparatus comprising a processor. Computer program instructions being stored on a computer memory may perform the aspects when executed by the processor. In the following, embodiments will be further explained with reference, to the attached drawings, wherein.

It is noted that the embodiments may be, technically implemented on cloud servers hosting distributable video and other multimedia applications, end-devices like mobile phones, network cameras and other entities that are able to record or display video and multimedia content, and internet gateways serving as a connection point between actual standard compliant network devices and platform services incorporating the proposed coding format.

While a basic incorporation of the proposed solution in a proprietary cloud environment should be possible without standardization, a potential adoption by ITU/ISO (MPEG) is possible as similar problems apply e.g. in environments, when mobile terminals off-load compute intense video processing tasks into a network centric cloud environment.

In a cloud based processing environment, in particular the following data transport scenarios between separate software tasks executed on distinct processing nodes may apply 1) Media data transport to and from end-devices (e.g. cameras, displays, smart-phones) to a media processing node across a network, e.g. the public Internet.
2) Media data transport between processing nodes within a single data center. This setup occurs as media processing tasks easily scale out of a single processing node because the media processing is computationally complex (i.e. processing intense).
3) Media data transport between processing nodes located in different data-centers in order to optimize overall resource consumption, e.g. transport resources in the network, and limit delay for man-machine interaction, e.g. by putting the processing close to where the user is.

It is noted here that the present embodiments particularly address cases 2) and 3) and also cover case 1) assuming that control of the transport between end-device and cloud node is provided, e.g. by having the capability to execute dedicated software on the device.

For example, a typical application scenario which profits from distributed processing on a service platform is for example video chat. In the video chat scenario, e.g. a group of people join a virtual shared video environment/video chat room. Each person streams video data of its camera(s) into the cloud. The video chat service combines all media streams of users meeting in such a shared environment and generates (i.e. processes) a personalized view of the virtual room for each participant. Thus, each person in the virtual room receives back a personalized rendered view of other participants.

Figure 1:
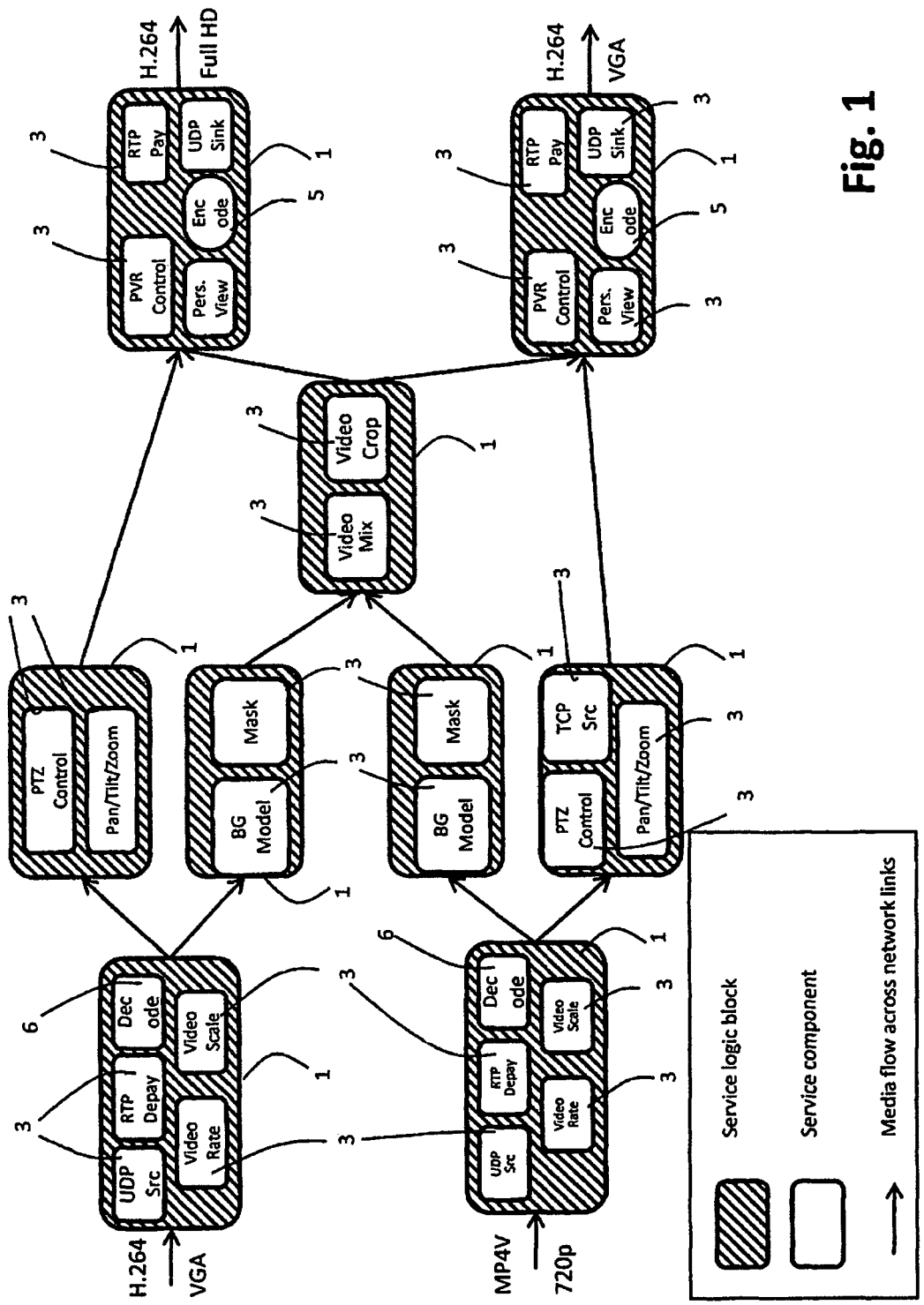
FIG. 1 shows an example of distributed processing components.
Figure 2:
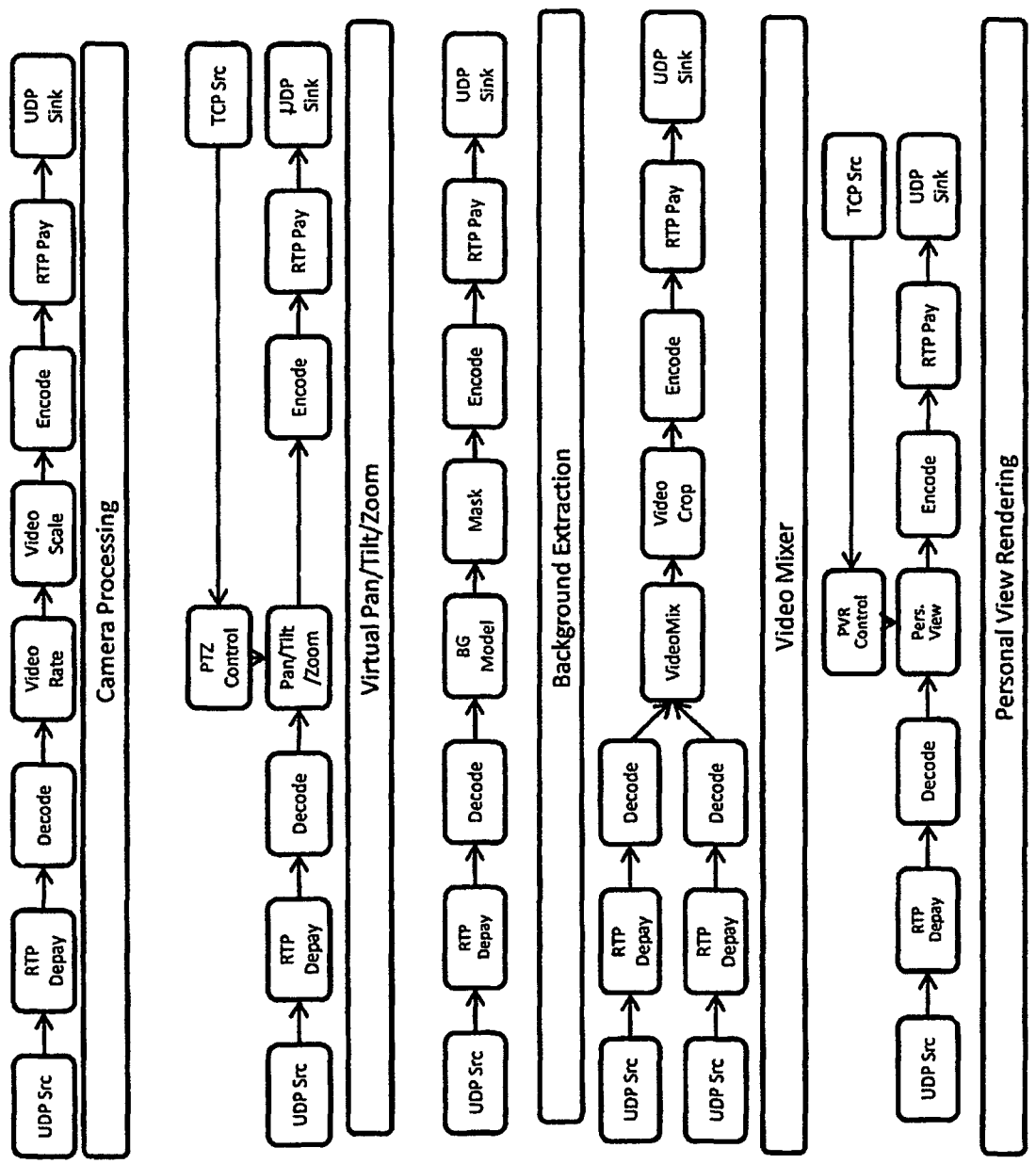
FIG. 2 shows an example of a pipeline oriented media framework.

FIGS. 1 and 2 are examples which describe a possible distribution of processing components 3 on distributed computing nodes 1 including codecs (coder 5 and decoder 6). Specifically, in FIG. 1 it is shown how service logic and resources may be split, e.g. for a video chat application, into logically dependent functions. In a possible deployment each of the depicted service logic blocks may end up in a different resource.

FIG. 2 depicts a pipeline oriented media framework with exemplary details of independent pipelines each having data receiver and encoder/decoder components, respectively, at possible transfer points. FIG. 2 specifically shows a service logic instantiation including different application tasks, e.g. components, such as camera processing, virtual pan/tilt/zoom, background extraction, video mixing, and personal view rendering.

Figure 3:
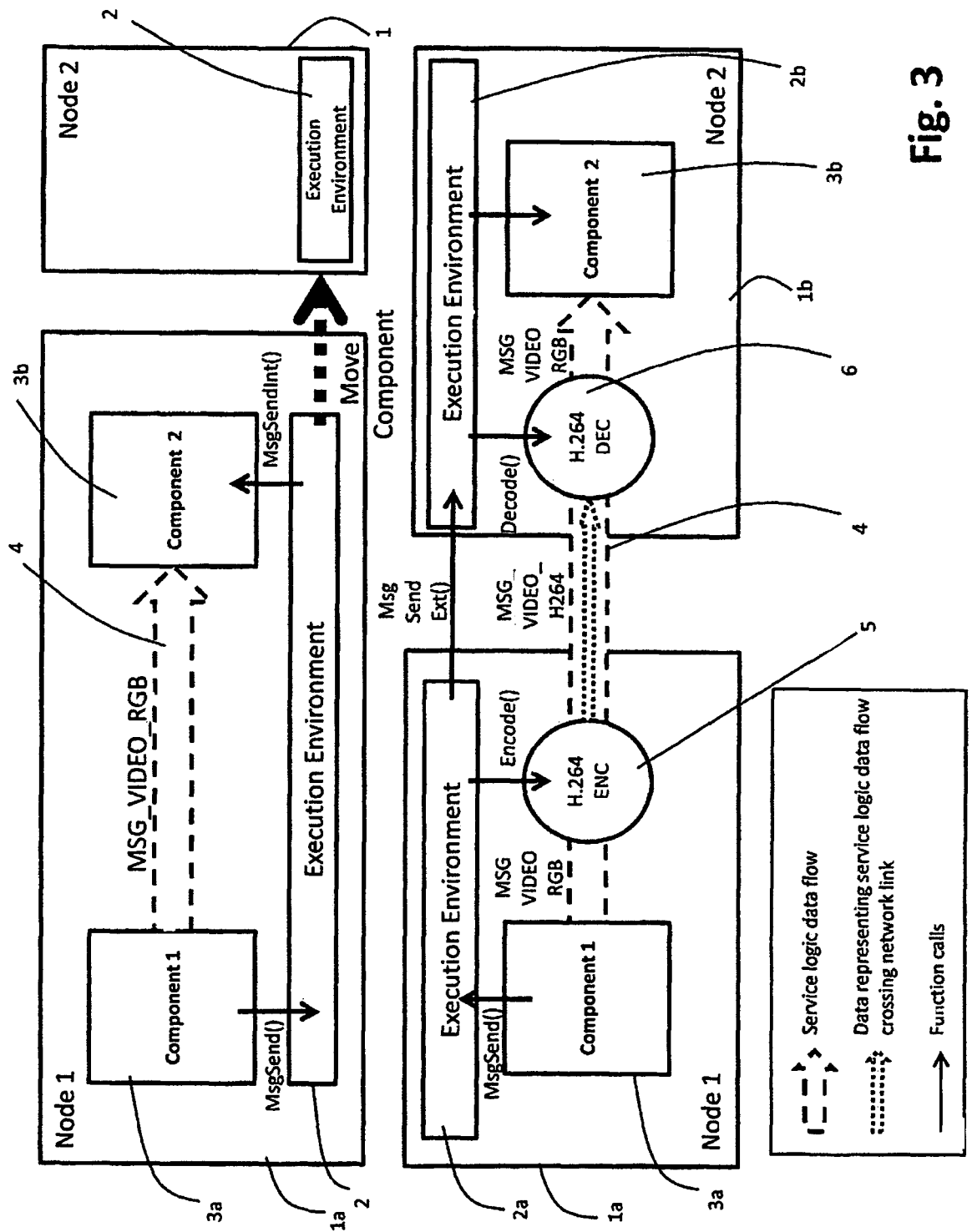
FIG. 3 shows a principal concept of the disclosed system.

FIG. 3 shows a principal design of a system (platform) according to the embodiments. In a preferred embodiment, at least two processing nodes 1 which are connected by a network, e.g. IP based Internet, Ethernet, etc, are comprised in the system. Processing components 3 of an application which shall be processed by the system are e.g. distributed over the two depicted nodes 1 of FIG. 3. In other words, the application is split into a plurality of parts, e.g. processing components or sub-applications. An application distribution function distributes the components 3 over the nodes 1 of the system, here e.g. a first node 1a and a second node 1b. Data exchange between the nodes 1 is enabled by communication channels 4. Preferably, data transport is carried out e.g. by passing messages from a node to another node. The message may comprise a header and payload, i.e. the data to be sent.

More specifically, on each node 1 a distributed processing platform is executed for instantiating, modifying and deleting media processing components 3. The processing components (components) 3 are processing parts of an application which is divided into said different components 3. Each component 3 has a platform wide unique identifier.

For example a video chat application may be divided into components such as a preprocessing of camera signals like e.g. back-ground subtraction, face or activity detection, e.g. a "who is speaking"-function; an interactive module allowing a user to navigate through a real camera's video signal, which may be at a high resolution, by controlling the pan, tilt and zoom factors of a virtual camera to create a personalized view, which may be at a lower resolution. Further components may be a video mixing functionality merging different video signals of people in the chat room on processing resources in the cloud (preferably located in the "center of delay" for all participants); and personal viewpoint rendering, controlled by interactive gestures of an end-user (preferably located on processing resources located close to this user).

FIG. 3 specifically shows that each node 1 has an execution environment 2. The execution environment 2 has means to connect at least two components 3 by instantiating a communication channel 4 between an outgoing, i.e. outbound, port of a first component 3a and an inbound port of a second component 3b. Such a connection 4 establishes a service logic data flow and can be realized in a distributed fashion by maintaining a table that describes all communication channels 4 of components 3 running on a node.

In embodiments, a new connection between two components 3 is instantiated by adding an entry into the table. The entry indicates which subsequent component 3 is the receiving component 3 (and its port) of the transferred data (e.g. a media stream) being sent by the outgoing port of the sending component 3. Said table may be controlled by the platform.

Further, in case that the receiving component is located on a remote node 1, which means that the communication channel 4 traverses a node boundary, the platform adds an identifier, which can be an IP-address, of the remote host (node) to the table entry.

FIG. 3 further shows two possible scenarios. A first scenario is depicted in the upper part of FIG. 3 which shows that the two components 3 of an application are both located within the same node 1. Therefore, the execution environment 2 instantiates a local communication channel 4 between the two components 3 without instantiating an encoder 5 and/or a decoder 6. That is, the data (payload) to be transferred from the sending component 3a to the receiving component 3b is preferably sent through the communication channel 4 without being encoded. This preserves computing resources. The message, e.g. being a header plus data, passing may be carried out by memory referencing.

In the tower part of FIG. 3 it is depicted that the receiving component 3b is located within a node 1b which is remotely arranged to another node 1a which contains the sending component 3a. Therefore, data transfer through the communication channel 4 requires e.g. a network protocol. A reason for the remote arrangement of the two components 3 might be, e.g., that the platform has initially arranged the components 3 on different nodes 1 or that the receiving component 3b was moved from a node 1 to another node 1 during processing. An example for the moving of a component 3 to a remote, node 1 after a communication channel 4 is established is shown in the upper part of FIG. 3. The relocation of the receiving component 3a, 3b is indicated by the "Move Component" arrow.

Generally, when data shall be transferred from a sending component 3a to a receiving component 3b, the sending component 3a invokes a platform function specifying a message type, a payload and a sending port of the data to be transferred.

Subsequently, the identifier of the receiver component 3b and its port is retrieved by using a lookup operation to the table. The lookup operation is adapted to determine whether one or more recipients of the message to be transferred is/are located on a remote host. If the receiver of the message is located on the same host than the sender, the message is stored in a node internal queue and finally delivered to the intended receiving component(s). In case the receiver of the message is located on a remote host, the message is then transmitted, stored in a queue on the remote node and finally passed to a receiving components message handler. At this time, the sender's port index is replaced by the receiver's port index, decoupling the two components 3 completely. Thus a sending component 3a has no notion where the corresponding end-point, i.e. the receiver(s) of the message is located, because the only linkage between both components is realized by the information being stored in the table which is, e.g., operated by the execution environment, and which may not be accessible by the components itself.

The platform (e.g. a control unit of the system (not shown in FIG. 3)) recognizes from the lookup operation whether a connection/communication channel 4 between components 3 traverses a network link (a border between two nodes 1). Further, in particular by analyzing the message type or the payload size, it may be determined whether the data rate can generate a congestion of the network link. This aspect of an automated compression is further explained below and particularly with regard to the lower part of FIG. 3.

It is again noted that a connection may become external either initially, when, a connection is established, because the corresponding component 3 is already instantiated on a processing resource at a remote location, or when, e.g. for load-balancing or other performance reasons, the platform decides to move a component 3 to another processing node 1 (see e.g. FIG. 3).

According to an aspect, after the creation of the communication channel 4 between two components 3 or after the migration of a component 3 onto a remote node 1 (a "component move"), a first flag associated with the respective table entry is set. When the next message is sent via the communication channel 4 and the introduced first flag is set, the platform parses the message header in order to determine the message type, determine the potential load for the network and determine the appropriate encoder for the corresponding message type. The parsing of the message header is particularly carried out in the following exemplarily scenario: A communication channel 4 is already established between two components 3 which are located on the same node 1. Then, at least one of the two components 3 is moved to a remote node 1, and the first flag is set for indicating the component move. Before the next message is sent through the communication channel 4, the system detects by the set first flag that the communication channel 4 passes the boundary of a node 1 and that encoding of the payload data might be necessary.

If the message is of a certain type for which a compression module exists and/or the data has a certain size, the platform (e.g. a control unit of the system) may determine that encoding/decoding is required for the communication channel 4. Further, it may be determined that encoding/decoding is required if one of the two nodes 1 being connected by the communication channel 4 or at least one of the two nodes 1 operates at a specific work load.

A specific example may be that the system (e.g. a control unit of the system) always initializes the codec in case that the data is media data, such as video or audio format data.

If encoding/decoding is required and preferably if a codec is available for the type of data to be transferred, a corresponding encoder 5 is initialized and, according to one option of instantiating a codec, a control message is sent to the receiving node 3 indicating that a corresponding decoder 6 needs to be initialized for the communication channel 4 on the remote resource (node) 1 hosting the receiving component 3. Then, the (payload) data to be transferred is passed from the sending component 3 to the encoder 5 and is encoded. Subsequently, the encoded data is sent from the encoder 5 to the remote side. The message comprising the data to be transferred can further comprise a second flag indicating that the transferred data is compressed. In the node 1 containing the receiving component 3, it may be checked whether the incoming/transferred data is encoded and, if the data is encoded, a decoder 6 is instantiated and the decoder 6 decodes the data before it transfers the decoded data to the receiving component 3. Possible codecs may comprise MPEG-1, MPEG-4, VPS, H.264, H.265, MELP, SILK, etc.

By the above-described, it is possible to keep the original data type for appropriately passing the data to be transferred to the receiving component 3. For example, a message in an original message type that is used for data exchange between processing components is encoded and encapsulated into a new message that is exchanged between the execution environments of the respective nodes. The execution environment of the receiving node receives this message, passes the included encoded original payload data to the decoder, and generates a message in the original message type for forwarding to the receiving component. Hence, the data (message) encoding/decoding operations are transparent to the processing components. Optionally, control information comprising information about a required decoder 6 and indicating the need to instantiate a decoder 6 may be inserted into a message which additionally comprises the encoded data to be transferred. By this, it is possible to avoid requesting additional communication, such as the sending of a separate control message, between the processing nodes 1, to ensure that the encoder 6 is correctly initialized.

According to a further aspect, encoder 5 and decoder 6 are initialized when the remote connection is established (even before a first message is sent). This may be done when either the application developer knows about the nature of a compression format in advance, which is then indicated through the connection create system call, or when the formal description of the components is analyzed to determine the expected message types and traffic rates. E.g. the application developer might expect or know that only video data is transferred through a specific communication channel so that a video codec such as MPEG-4, VP8, H.264, or H.265 may be initialized for this specific communication channel. Consequently, several alternative options for the instantiating of a codec are disclosed herein which are described in greater detail above.

Figure 4:
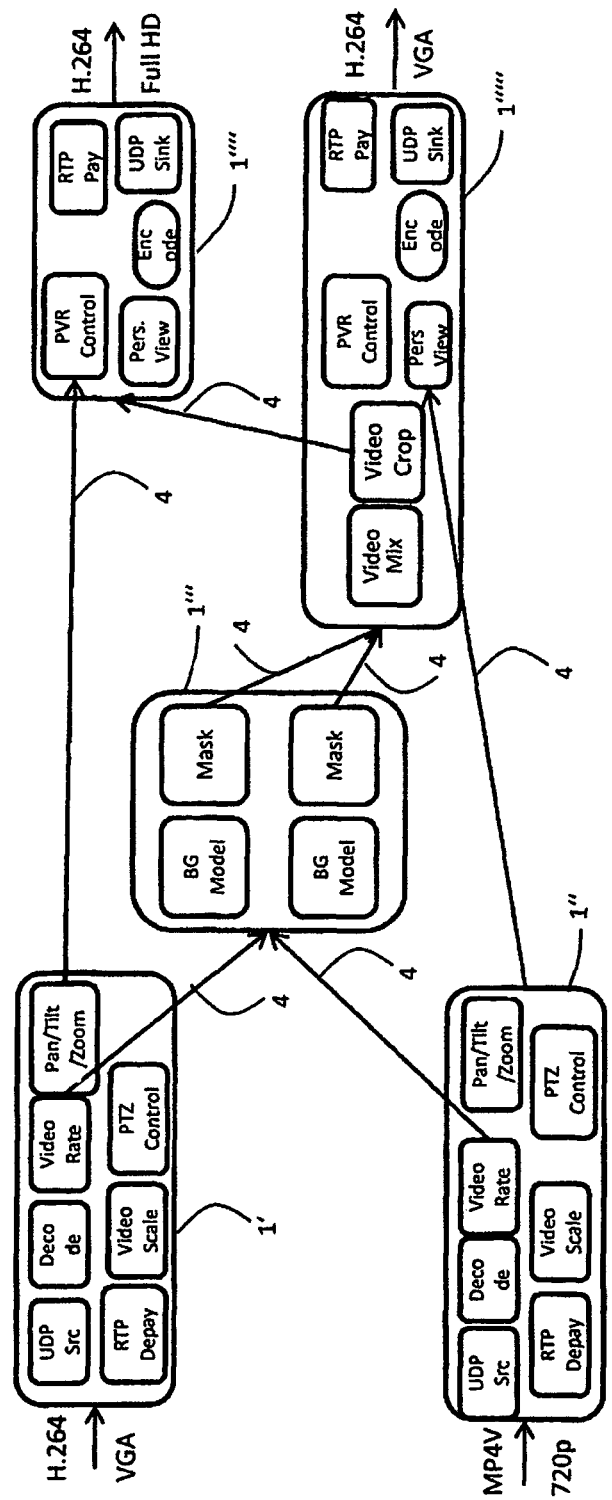
FIG. 4 shows an example of automatically, distributed processing components of an application.

FIG. 4 shows the result of a deployed application, e.g. a video chat service, which uses as few as possible resources of the platform due to an optimized splitting of the application and an automatic encoding of data, i.e. data can be exchanged in an automatically encoded manner between the different nodes 1, as explained above. For example, FIG. 4 shows that a pan/tilt/zoom (PTZ) component 3 of the video chat application is distributed over two different nodes 1', 1". One of the two nodes 1' processes video data having a complex codec, e.g. H.264, and a low resolution, e.g. VGA. The other node 1" processes PTZ for video data with a high resolution, e.g. 720p, and a simple codec, e.g. MP4V. Both PTZ-processing nodes 1', 1" may establish a communication channel 4 with a background extraction (BG) component being located on a further, separate node 1'". Further, both PTZ-processing nodes 1', 1" of FIG. 4 may also sent data via a communication channel 4 to nodes which process a personal view (PV) rendering. In the present example of FIG. 4, a node 1"" is used for processing a high resolution PV rendering and a further node 1""' is used for processing a low resolution PV rendering. Since the low resolution PV rendering does not demand much computing resources, the platform has decided, in the present example of FIG. 4, to collocate a video mixing component 3 on the same node 1""' as the low resolution PV rendering. Summarizing, FIG. 4 shows an example for an automatically distributed video chat application. Data transfer between the processing components 3 may be carried out via communication channels 4. If the communication channel 4 passes a boundary of a node 1, as e.g. shown in FIG. 4 for the communication channels 4 between PTZ processing nodes 1', 1" and the BG processing node 1'", or between the PTZ processing nodes 1', 1" and the PV rendering processing nodes 1"", 1""', the system may automatically instantiate a codec for reducing the data traffic.

Summarizing, the proposed node, system and method allow flexible deployment of media applications in a distributed (cloud-based) execution environment. Application developers do not need to keep resource constraints in their mind, but may manage only the service logic. This means the cloud becomes virtually a single resource. By applying the proposed method and the system implementing the method, it is possible to improve the overall resource utilization, because it allows the platform to split the service logic of the application between the computing resources much more efficiently compared to more coarse grained approaches, e.g., realized through deployments of virtual machines or even dedicated service components introduced by the application developer. It is considered to achieve a better utilization of −30-40% compared to existing solutions. Service and application development is simplified resulting in broader adoption of the underlying cloud platform.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

It should be noted that the description and drawings merely illustrate the principles of the proposed methods and systems. It will thus be appreciated that those skilled in the art will be able to devise various arrangements that, although not explicitly described or shown herein. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A control unit, comprising at least one processor and at least one memory including a computer program code, the at least one memory and the computer program code configured to, with the at least one processor, cause the control unit at least to:
   automatically distribute processing components of an application over processing nodes of a distributed processing service platform;
   determine whether a communication channel between two processing components traverses a boundary of a processing node;
   if it has been determined that the communication channel traverses a boundary of one of the processing nodes, determine whether an encoding and/or decoding of data to be transferred through the communication channel is required; and,
   store information about an established communication channel;
   wherein the information comprises a port of a sending component and of a receiving component for the established communication channel.

2. The control unit according to claim 1, wherein the at least one memory and the computer program code are further configured to, with the at least one processor, cause the control unit to determine that encoding/decoding is required in case that the data to be transferred exceeds a predetermined size.

3. The control unit according to claim 1, wherein the at least one memory and the computer program code are further configured to, with the at least one processor, cause the control unit to determine that encoding/decoding is required in case that the data to be transferred has a predetermined data type, wherein the predetermined data type is a media data type, such as image data, audio data, video data.

4. The control unit according to claim 1, wherein the at least one memory and the computer program code are further configured to, with the at least one processor, cause the control unit to determine that encoding/decoding is required in case that one of the sending and receiving nodes or both operate at a predetermined work load.

5. The control unit according to claim 1, wherein the at least one memory and the computer program code are further configured to, with the at least one processor, cause the control unit to determine that encoding/decoding is required in case that the data to be transferred has a predetermined data type, wherein the predetermined data type is a media data type comprising video data.

6. A system comprising at least two processing nodes, wherein:
   at least one of the nodes comprise an execution environment and at least one processing component,
   the execution environment includes an establisher configured to establish a communication channel between an outgoing port of a processing component and an inbound port of a different processing component,
   the execution environment is further configured to instantiate, modify and delete distributed processing components on the respective node, and
   the system further comprises a control unit comprising at least one processor and at least one memory including a computer program code, the at least one memory and the computer program code configured to, with the at least one processor, cause the control unit at least to:
   automatically distribute processing components of an application over processing nodes of a distributed processing service platform;
   determine whether a communication channel between two processing components traverses a boundary of a processing node;
   if it has been determined that the communication channel traverses a boundary of one of the processing nodes, determine whether an encoding and/or decoding of data to be transferred through the communication channel is required; and,
   wherein the information comprises a port of a sending component and of a receiving component for the established communication channel.

7. The system according to claim 6, the system further comprising a table containing the information about the established communication channel, wherein
   said information further comprises an identifier when the receiving component is located within a different node than the sending component, and
   wherein the identifier identifies a network location of the receiving node.

8. The system according to claim 7, wherein the at least one memory and the computer program code are further configured to, with the at least one processor, cause the control unit to detect whether the communication channel traverses a boundary of a node by performing a lookup operation in said table by detecting whether an entry which indicates a reallocation of a component is set in said table and/or to read said identifier for finding the location of the node of the receiving component.

9. The system according to claim 6, wherein the execution environment of a respective node is configured to provide a message passing interface between processing components of said node, wherein said processing components are further configured to communicate via said message passing interface connecting an output port of a sending component with an input port a receiving component.

10. A sending processing node comprising at least one processor and at least one memory including a computer program code, the at least one memory and the computer program code configured to, with the at least one processor, cause the sending processing node at least to:
 instantiate, modify and delete distributed processing components of an application on the node; and
 establish a communication channel between at least one outgoing port of a processing component of said sending processing node with a receiving processing node;
 send data through the communication channel;
 wherein the sending processing node comprises a control unit comprising at least one control unit processor and at least one control unit memory including a control unit computer program code, the at least one control unit memory and the control unit computer program code configured to, with the at least one control unit processor, cause the control unit at least to:
  automatically distribute processing components of an application over processing nodes of a distributed processing service platform;
  determine whether a communication channel between two processing components traverses a boundary of a processing node;
  if it has been determined that the communication channel traverses a boundary of one of the processing nodes, determine whether an encoding and/or decoding of data to be transferred through the communication channel is required; and
  store information about an established communication channel;
 wherein the information comprises a port of a sending component and of a receiving component for the established communication channel;
 wherein the sending processing node is configured to, if encoding is determined to be required, to instantiate an encoder and to inform the receiving processing node about a type of encoder being instantiated.

11. A receiving processing node comprising at least one distributed processing component, at least one processor and at least one memory including a computer program code, the at least one memory and the computer program code configured to, with the at least one processor, cause the receiving processing node at least to:
 instantiate, modify and delete distributed processing components on the node; and
 wherein
 at least one inbound port of a processing component is connectable via a communication channel with a sending processing node for receiving data through the communication channel;
 wherein the receiving processing node comprises a control unit comprising at least one control unit processor and at least one control unit memory including a control unit computer program code, the at least one control unit memory and the control unit computer program code configured to, with the at least one control unit processor, cause the control unit at least to:
  automatically distribute processing components of an application over processing nodes of a distributed processing service platform;
  determine whether a communication channel between two processing components traverses a boundary of a processing node;
  if it has been determined that the communication channel traverses a boundary of one of the processing nodes, determine whether an encoding and/or decoding of data to be transferred through the communication channel is required; and
  store information about an established communication channel;
 wherein the information comprises a port of a sending component and of a receiving component for the established communication channel;
 wherein the receiving processing node is configured to instantiate a decoder, if encoding is determined to be required, based on information about a type of encoder being instantiated at the sending processing node, the information received from the sending processing node.

12. A method for data communication within a system having at least two processing nodes, wherein:
 at least one node is configured to instantiate, modify and delete distributed processing components on the respective node, and
 further configured to connect an outgoing port of a processing component sending data with an inbound port of a processing component receiving data via a communication channel, and the method comprises:
 automatically distributing processing components of an application onto the nodes;
 establishing a communication channel between a sending processing component and a receiving processing component;
 determining whether the communication channel traverses a boundary of a node;
 determining whether an encoding/decoding of data to be transferred through the communication channel is required, in response to a determination that a boundary of a node is traversed;
 instantiating an encoder within the node of a sending component and a decoder within the node of the receiving component, in response to a determination that encoding/decoding is to be required;
 providing the data to be transferred from the sending component to the encoder and encoding the data within the encoder;
 sending the encoded data through the communication channel to the receiving node; and
 storing information about an established communication channel;
 wherein the information comprises a port of a sending component and of a receiving component for the established communication channel.

13. The method according to claim 12, wherein, after the encoder was instantiated by the node of the sending component, a message comprising control information about a type of encoder being instantiated is sent from the execution environment of the node of the sending component to the execution environment of the node of the receiving component, and wherein
 the decoder is instantiated based on said control information comprised in the message.

14. The method according to claim 13, wherein the data to be transferred is sent from the sending node to the receiving node through the communication channel upon the instantiation of the decoder.

15. The method according to claim 13, wherein the data to be transferred is sent within a message also comprising the control information.

16. The method according to claim 12, wherein the encoder on a sending side and the decoder on a receiving side are instantiated at the same time of establishing the communication channel and before sending data through the communication channel.

* * * * *